UNITED STATES PATENT OFFICE.

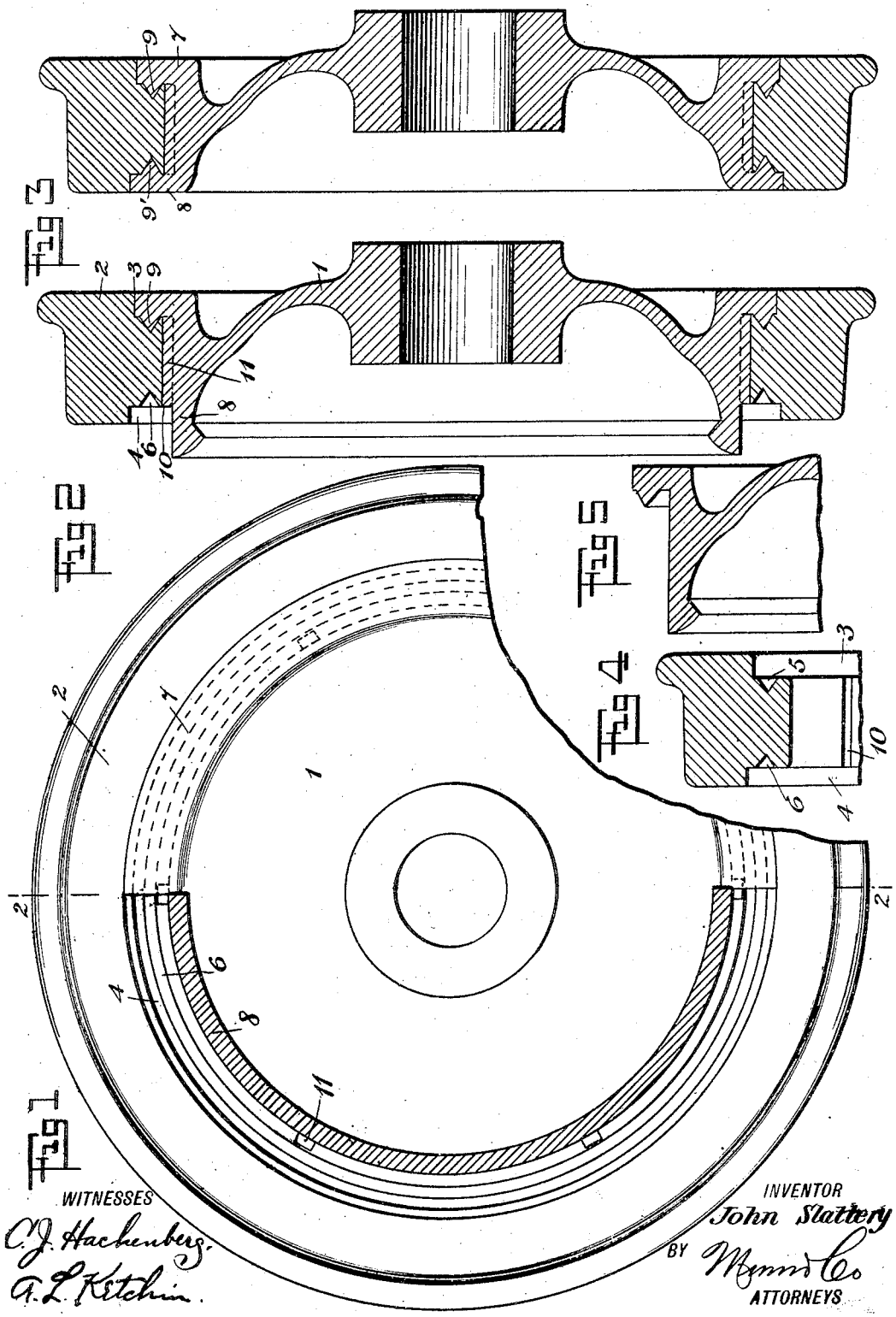

JOHN SLATTERY, OF CHROME, NEW JERSEY.

CAR-WHEEL.

1,104,562.

Specification of Letters Patent.

Patented July 21, 1914.

Application filed February 10, 1914. Serial No. 817,829.

*To all whom it may concern:*

Be it known that I, JOHN SLATTERY, a citizen of the United States, and a resident of Chrome, in the county of Middlesex and State of New Jersey, have invented a new and Improved Car-Wheel, of which the following is a full, clear, and exact description.

This invention relates to improvements in car wheel construction, and has for an object to provide an improved wheel structure wherein a solid center is presented and a wearing rim connected with the periphery thereof.

Another object of the invention is to provide an improved wheel in which is presented an improved locking member for the wearing rim or tire, whereby the parts are rigidly connected together.

In carrying out the object of the invention a center or body is provided in any desired manner, and is formed with flanges extending therefrom, which flanges are adapted to be interlocked with suitable grooves in a tire or wearing band. The tire or wearing band is provided with annular notches and an annular groove merging into said notches, which grooves and notches receive the flanges from the center or body. In mounting the rim in place one of the flanges of the center or body is arranged radially so as to properly fit the rim or tire, and the other is arranged parallel with the axis of the body and then rolled or bent over and pressed into the notches and grooves of the tire. A plurality of lugs are arranged in the body and fitted into grooves in the tire so as to positively prevent any sliding of one member in respect to the other.

In the accompanying drawings—Figure 1 is a side view of a wheel disclosing an embodiment of the invention, certain parts being broken away; Fig. 2 is a section through Fig. 1 approximately on line 2—2; Fig. 3 is a sectional view similar to Fig. 2 except that the parts have been properly fitted in place; Fig. 4 is a fragmentary sectional view through the tire or shoe of the wheel; Fig. 5 is a fragmentary sectional view through part of the body of the wheel.

Referring to the accompanying drawings by numeral, 1 indicates the body of the wheel and 2 the tire or shoe.

In forming car wheels it is desired to make the body 1 and shoe 2 out of different grades of material. For instance, the shoe 2 is made out of a high grade material, while the body 1 is made out of a comparatively low grade of material. This reduces the expense of the manufacture of the wheels, but allows a high grade traction surface to be presented to the rails. In the formation of the shoe or tire 2 the periphery is made in the usual manner, and in fact the entire rim is rolled so as to be of the right size, and in the rolling notches 3 and 4 are provided, which merge into grooves 5 and 6. In manufacturing the body 1, which may be of any desired material, but preferably of a low grade of material, the flanges 7 and 8 are rolled so that one flange will extend radially and the other axially. In the drawing, flange 7 is shown as the radial flange which fits into notch 3, while the bead 9 fits into groove 5. The flange 8 as shown in Fig. 2 does not fit into the notch 4 until after the shoe 2 has been placed in position. After shoe 2 has been placed in position the flange 8 is bent over and forced into position, as shown in Fig. 3. The parts may be hot when this is done or the flange may be rolled in a cold state. In forming the bead 9 and the periphery of the body 1 the same may be formed by rolling or by being turned in a lathe, and also the shoe 2 may be finished in a lathe so that the parts will accurately fit when assembled. The flange 8 is provided with extra material which is on the inner surface when the flange is in the position shown in Fig. 2, but is forced into the body of the flange while some of the body of the flange is forced into groove 6 for providing the V-shaped bead 9' shown in Fig. 3. By this means the body is provided with radial flanges fitting into the notches 3 and 4. When forming the shoe 2 the same is provided with a plurality of transverse notches or grooves 10 which receive the lugs 11, whereby the shoe 2 is prevented positively, any rotation independent of body 1. The lug 11 may be a projection from body 1, or a suitable keyway may be provided in body 1 and a key inserted therein which will connect the body 1 and shoe 2, thus acting as a double key. As shown in Fig. 3, when the wheel is completed the flanges 7 and 8 are arranged in the notches 3 and 4, while the beads 9 and 9' are arranged in the grooves 5 and 6, thus locking by a form of dovetail the shoe and the body of the wheel. Ordinarily, when the parts are assembled, as shown in Fig. 3, the pinching action of the parts will be sufficient for properly holding the shoe in place, but the lugs or keys 11 will positively prevent any independent movement of either of the members 1 or 2.

What I claim is—

In a wheel of the character described, a shoe provided with an internal annular flange, the sides of said flange being offset inwardly from the sides of the shoe and formed on the sides with V-shaped grooves, a body arranged in said shoe provided with a peripheral bearing surface fitting against the inner surface of said flange, a radial flange having a V-shaped bead extending normal thereto for fitting into one of the grooves in said annular flange, and a horizontally extending bendable flange, said bendable flange being adapted to be forced over against the flange on said shoe and into the V-shaped groove therein, whereby the shoe and the body are clenched together, and key members connecting said body and said shoe for preventing a rotation of the shoe independent of the body.

In testimony whereof I have signed my name to this specification in the presence of two subscribing witnesses.

JOHN SLATTERY.

Witnesses:
  WILLIAM J. LAWLOR,
  RUSSELL MILES.

Copies of this patent may be obtained for five cents each, by addressing the "Commissioner of Patents, Washington, D. C."